(12) United States Patent
Kim et al.

(10) Patent No.: US 12,154,311 B2
(45) Date of Patent: Nov. 26, 2024

(54) METHOD AND APPARATUS FOR IDENTIFYING DISASTER AFFECTED AREAS USING DISASTER PRONE AREAS FEATURES

(71) Applicant: NATIONAL DISASTER MANAGEMENT RESEARCH INSTITUTE, Ulsan (KR)

(72) Inventors: Seong Sam Kim, Ulsan (KR); Dong Yoon Shin, Ulsan (KR); Cheol Kyu Lee, Ulsan (KR)

(73) Assignee: NATIONAL DISASTER MANAGEMENT RESEARCH INSTITUTE, Ulsan (KR)

( * ) Notice: Subject to any disclaimer, the term of this patent is extended or adjusted under 35 U.S.C. 154(b) by 374 days.

(21) Appl. No.: 17/736,325

(22) Filed: May 4, 2022

(65) Prior Publication Data
US 2022/0358746 A1 Nov. 10, 2022

(30) Foreign Application Priority Data
May 4, 2021 (KR) ........................ 10-2021-0057836

(51) Int. Cl.
*G06V 10/74* (2022.01)
*G06V 20/00* (2022.01)
*G06V 20/10* (2022.01)

(52) U.S. Cl.
CPC .............. *G06V 10/74* (2022.01); *G06V 20/10* (2022.01); *G06V 20/35* (2022.01)

(58) Field of Classification Search
None
See application file for complete search history.

(56) References Cited

U.S. PATENT DOCUMENTS

| 11,836,216 | B1 * | 12/2023 | McIntyre | .............. G06F 18/251 |
| 11,869,192 | B2 * | 1/2024 | Yousefhussien | ..... G06V 20/188 |
| 2021/0142559 | A1 * | 5/2021 | Yousefhussien | ............................ G06Q 10/06315 |
| 2022/0358746 | A1 * | 11/2022 | Kim | ........................ G06V 20/10 |
| 2024/0028668 | A1 * | 1/2024 | McIntyre | ................. G06N 3/08 |

FOREIGN PATENT DOCUMENTS

| KR | 102203135 B1 | 1/2021 |
| WO | 2020111934 A1 | 6/2020 |

* cited by examiner

*Primary Examiner* — Tahmina N Ansari
(74) *Attorney, Agent, or Firm* — NKL Law; Byungwoong Park

(57) ABSTRACT

An operation method of a server for identifying disaster affected areas. The operation method of the server may include acquiring at least one first disaster image; deriving an affected area from each of the at least one first disaster image and acquiring affected area related information through labeling based on the derived affected area; and training a first learning model using the at least one first disaster image and the affected area related information.

13 Claims, 15 Drawing Sheets

【Figure 1】
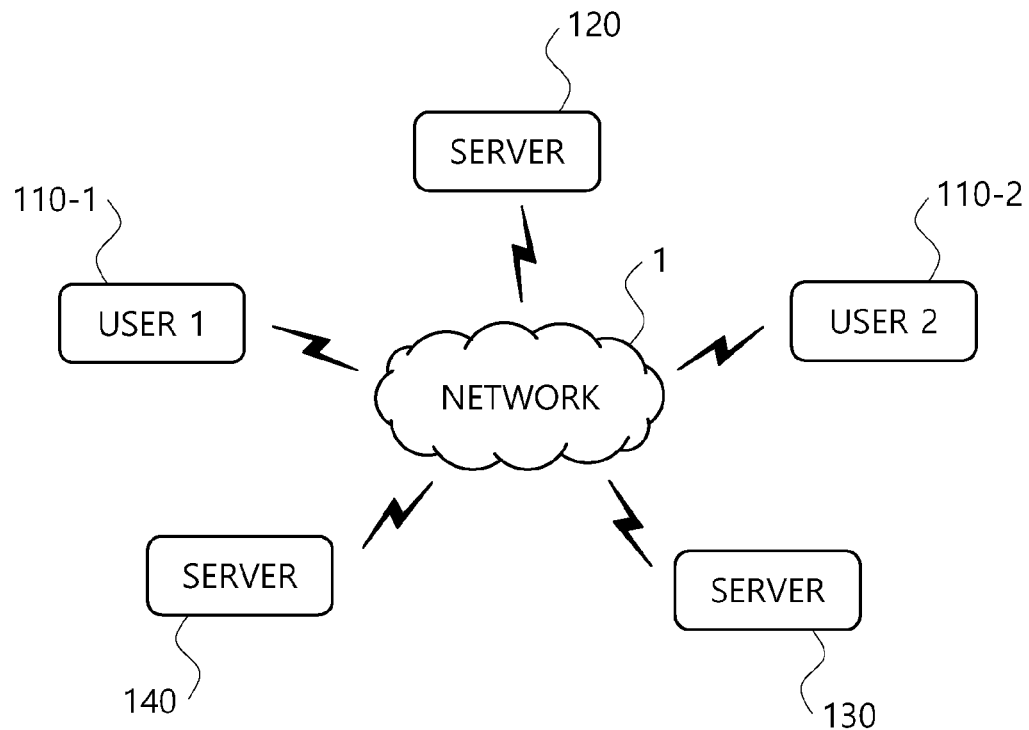
【Figure 2】
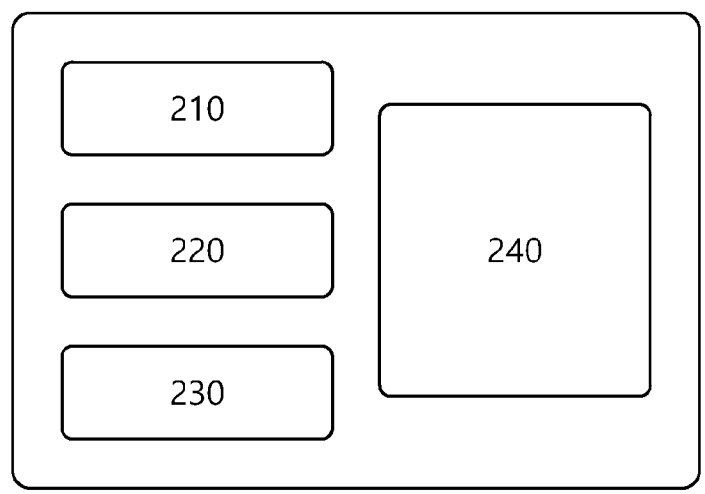

【Figure 3a】
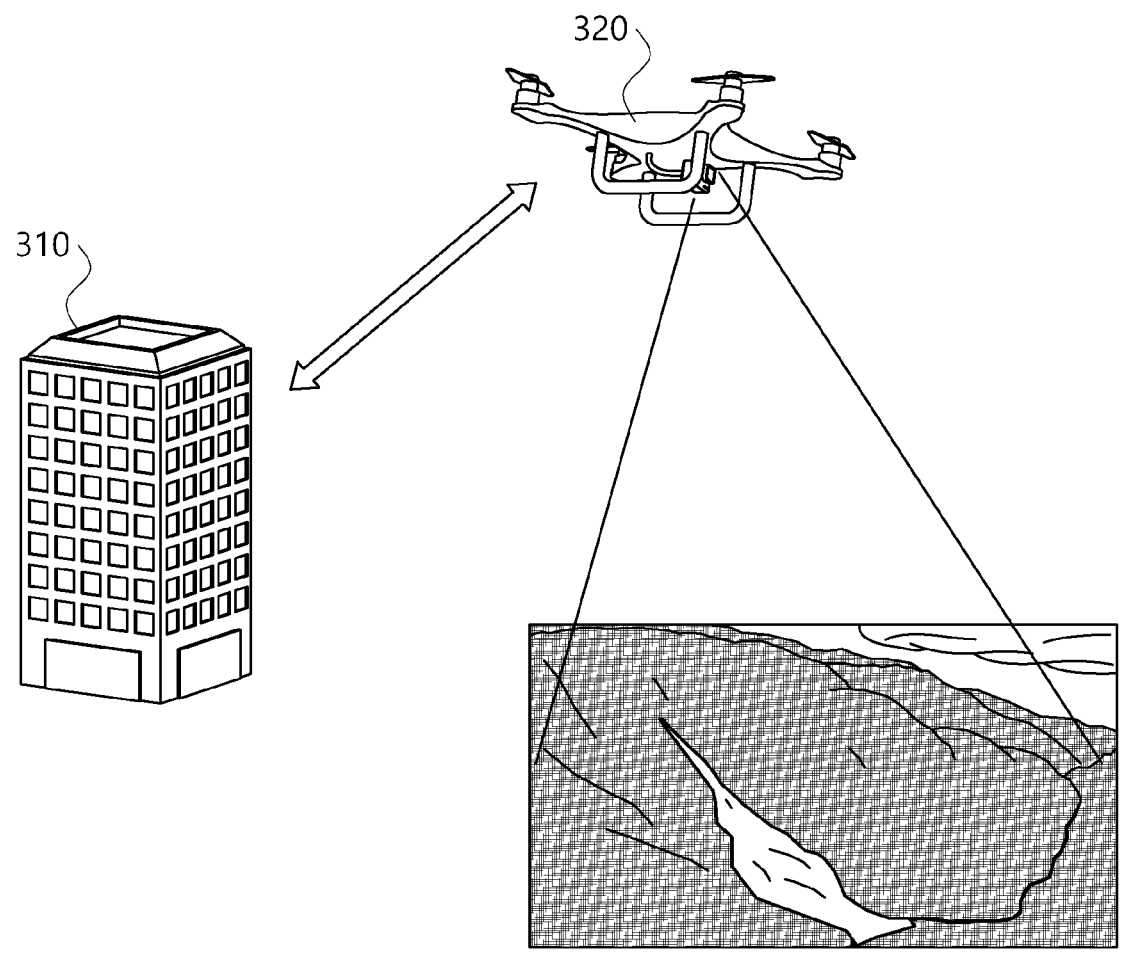

【Figure 3b】
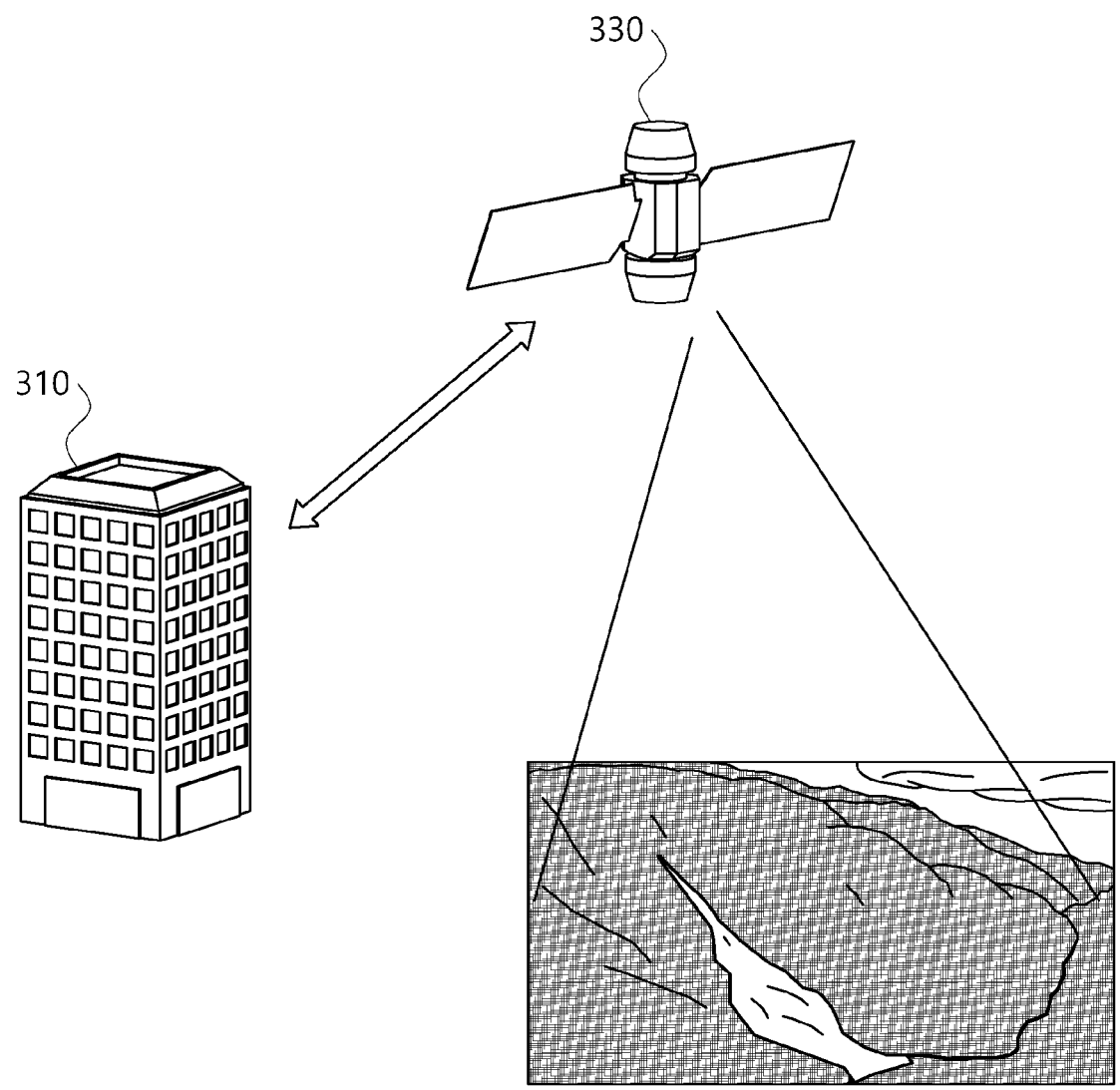

【Figure 3c】
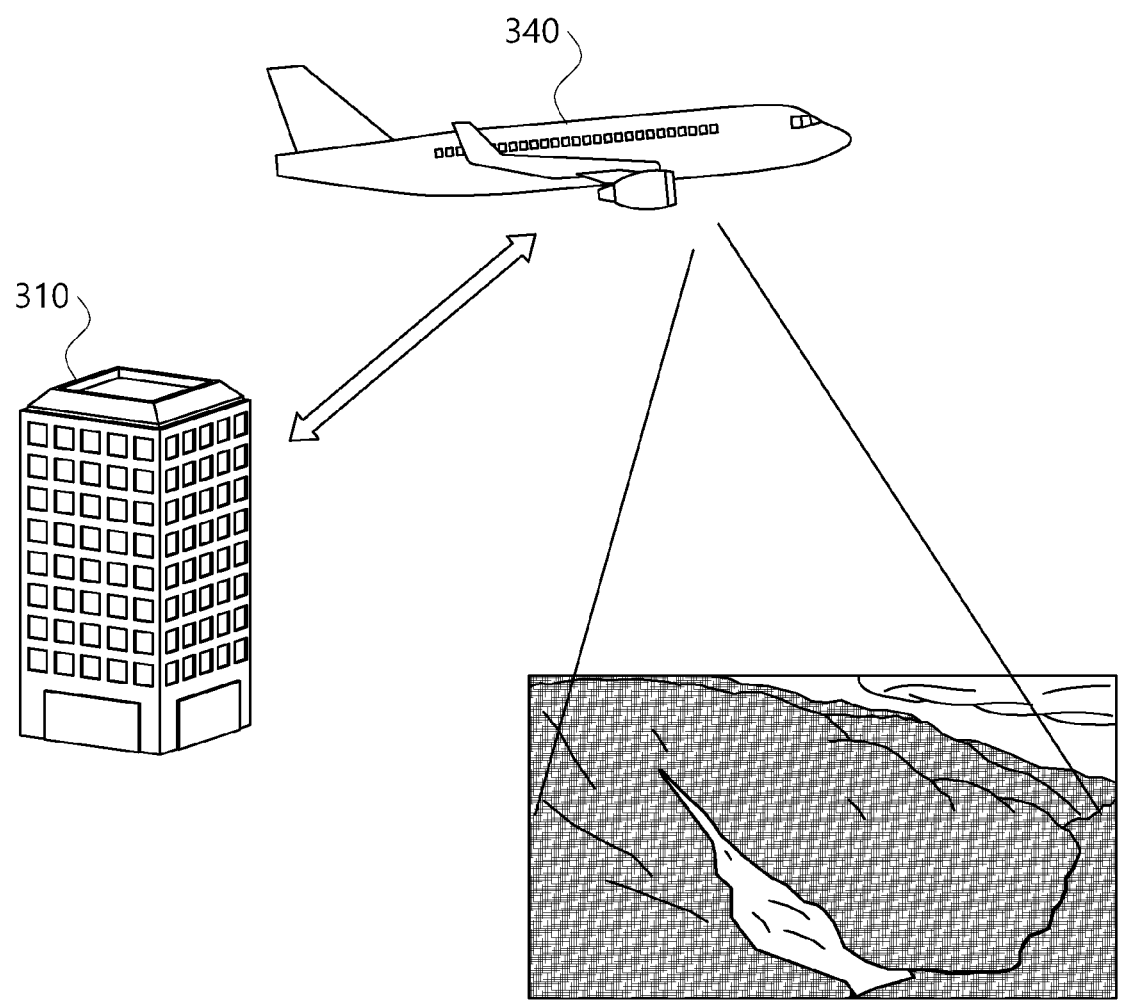

【Figure 4】
1. Affected area: Hatched
2. Type of damage: Flooding, landslide
3. Neighborhood feature: Lots of pine trees, near valley
4. Damage propagation: XX
5. Weather information at the time of disaster: Rainfall 10 mm, temperature 28°C
6. Date: 2021. 07.10
【Figure 5a】
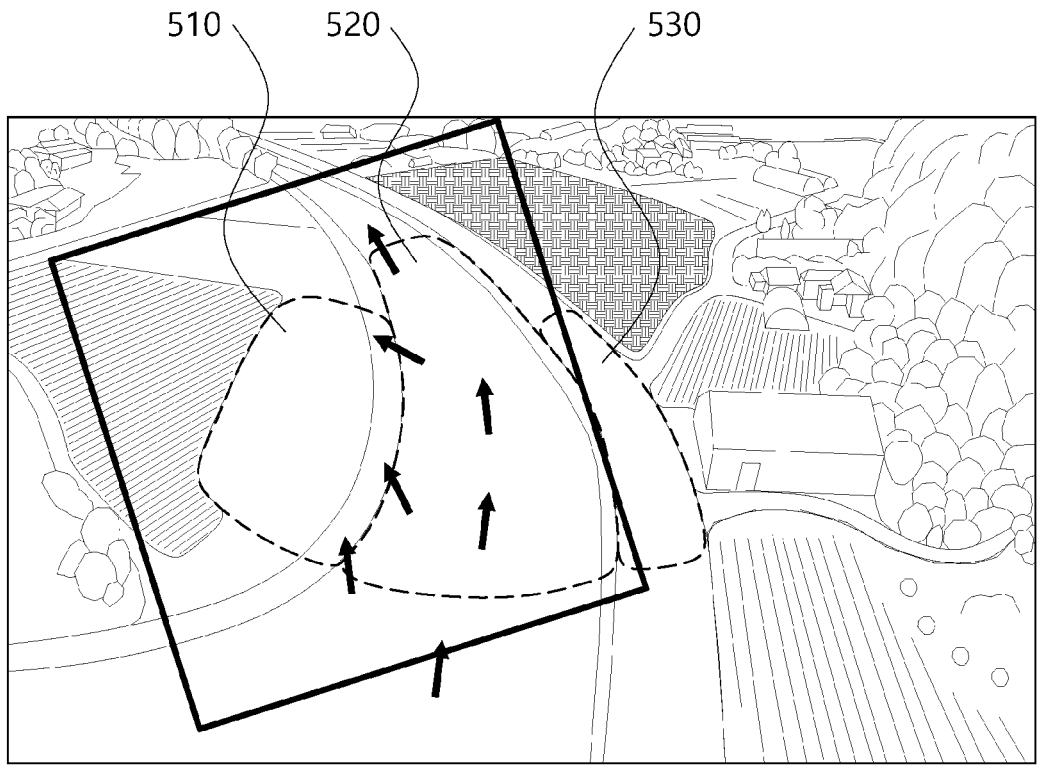

【Figure 5b】
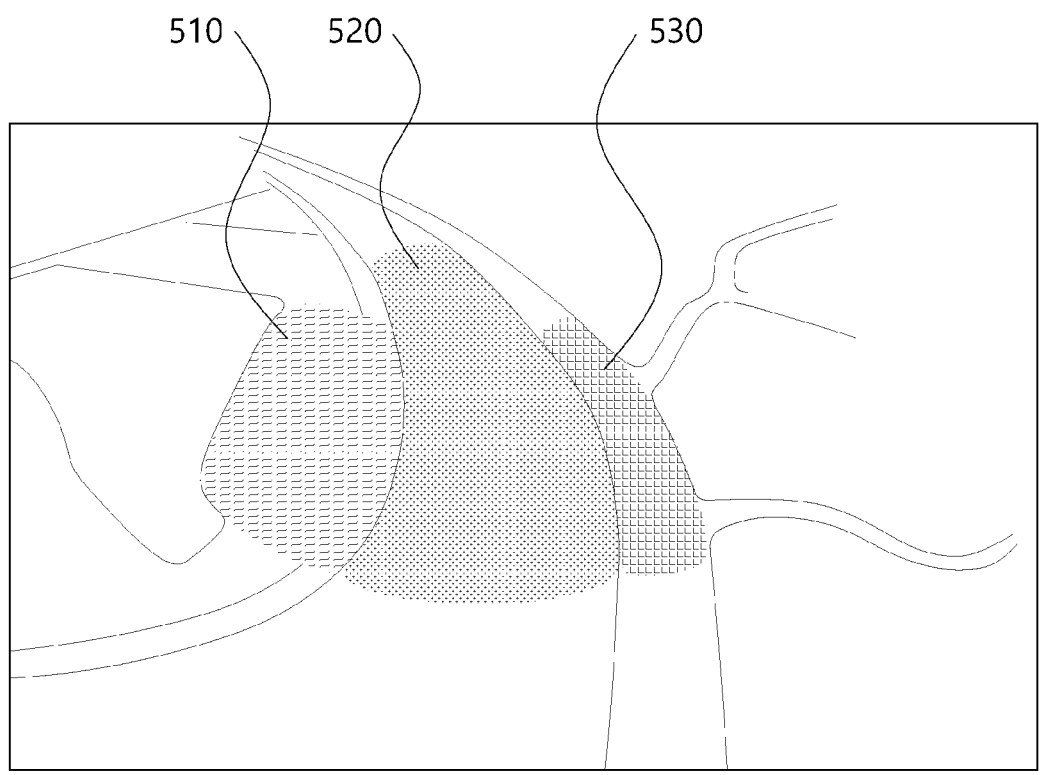

【Figure 5c】
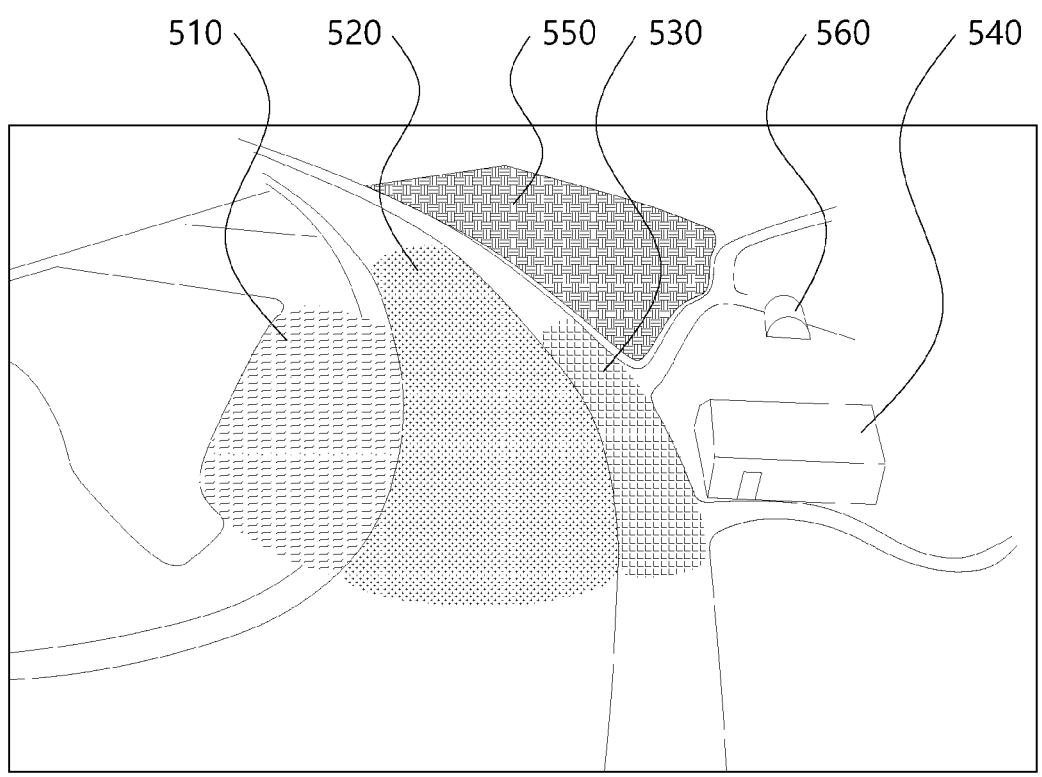

[Figure 6]
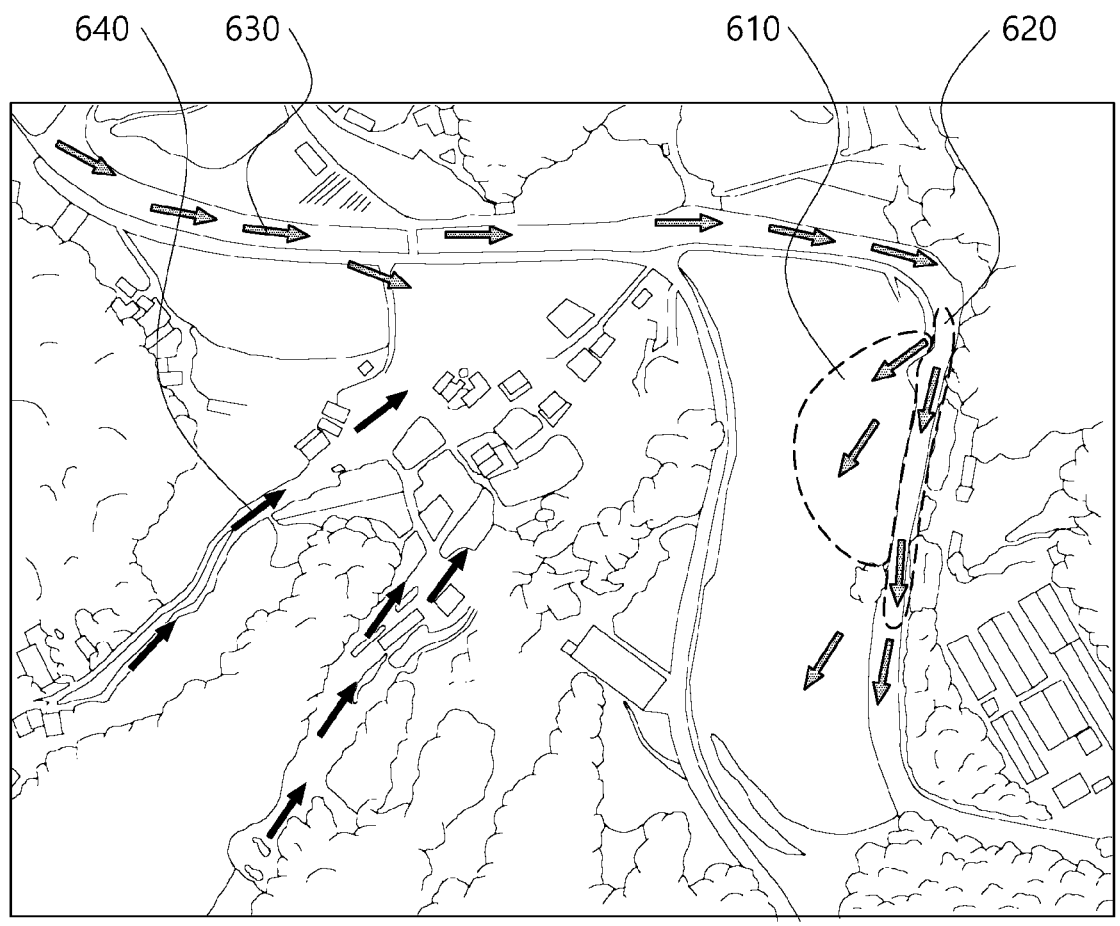

【Figure 7a】
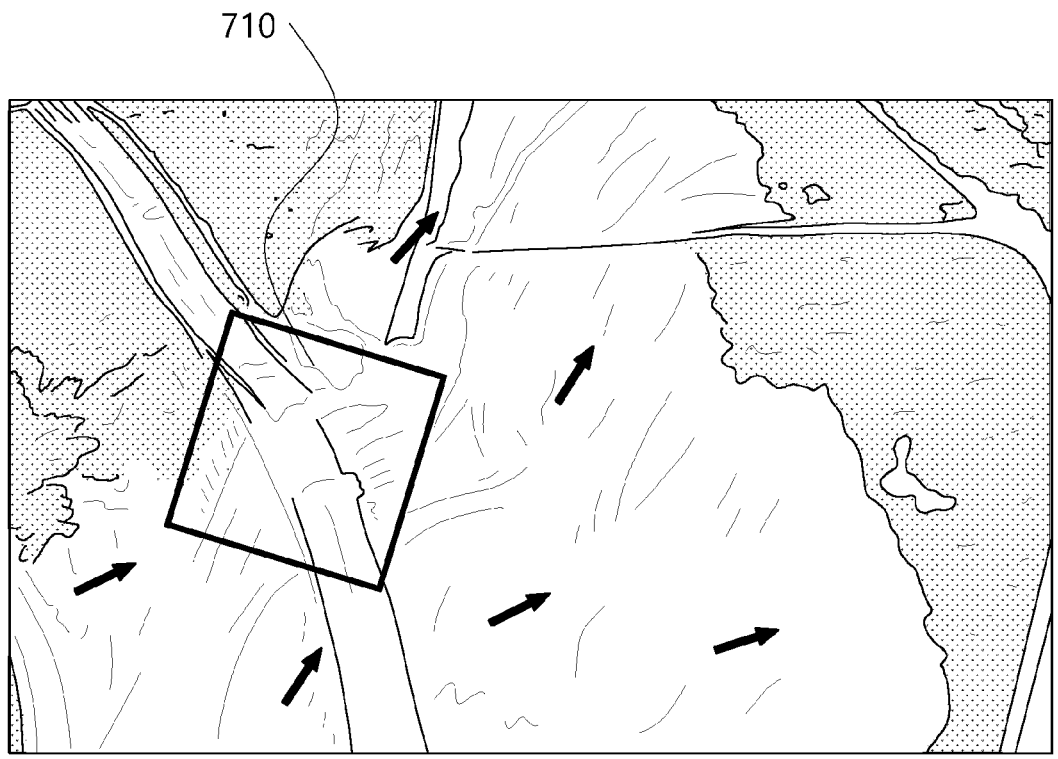
【Figure 7b】
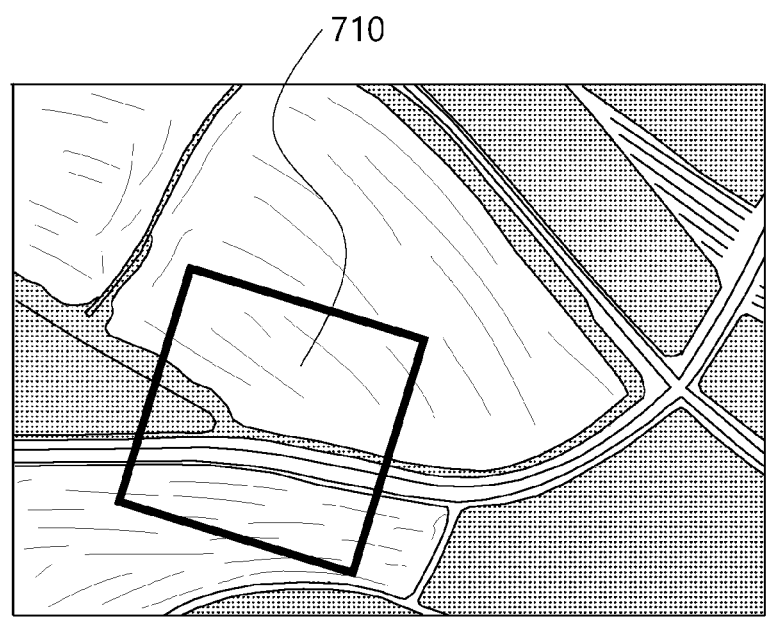

【Figure 7c】
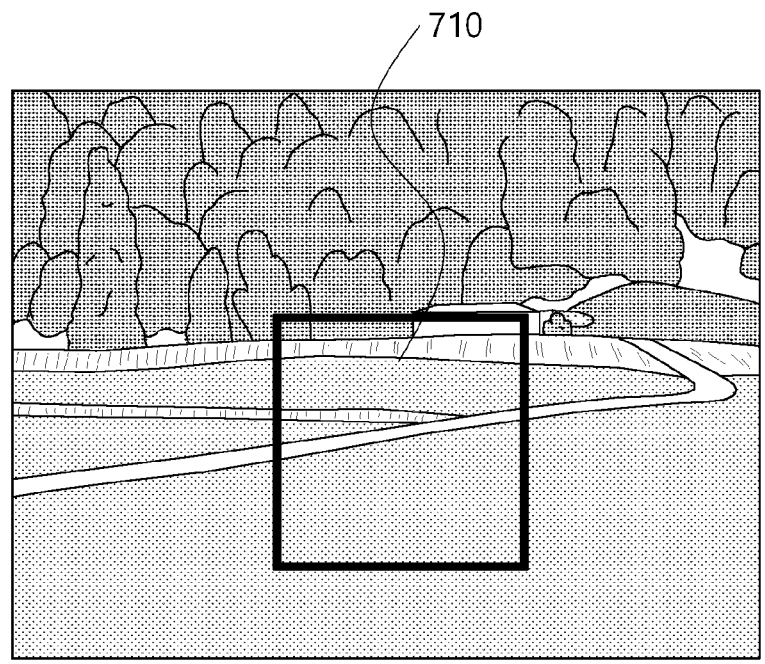
【Figure 8a】
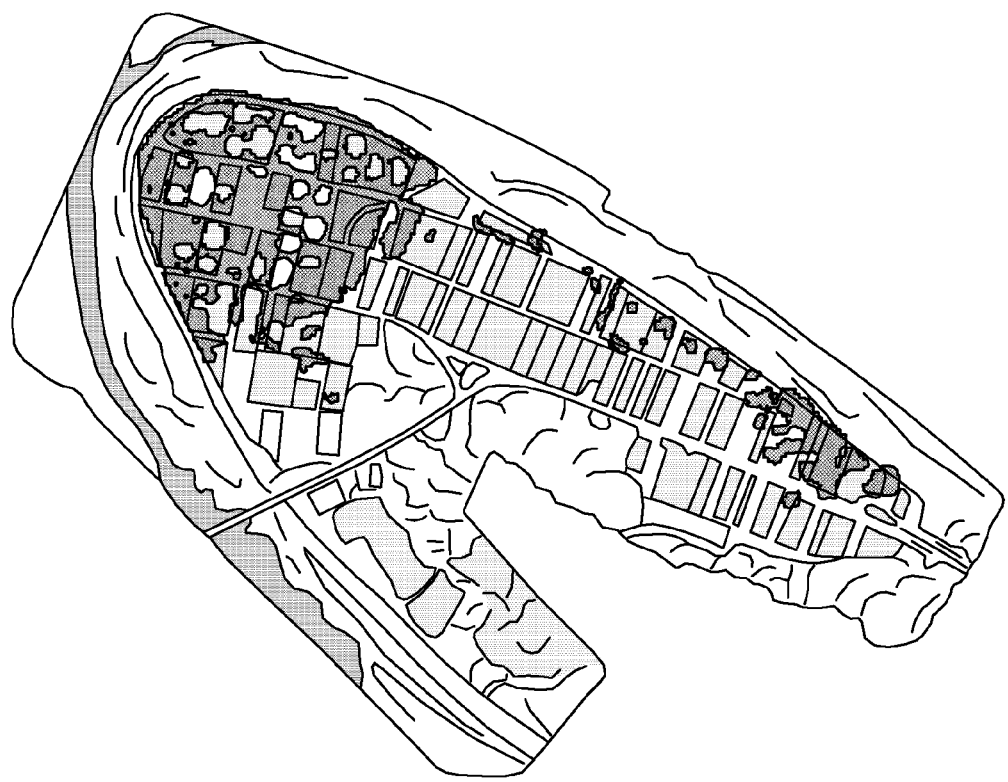

【Figure 8b】
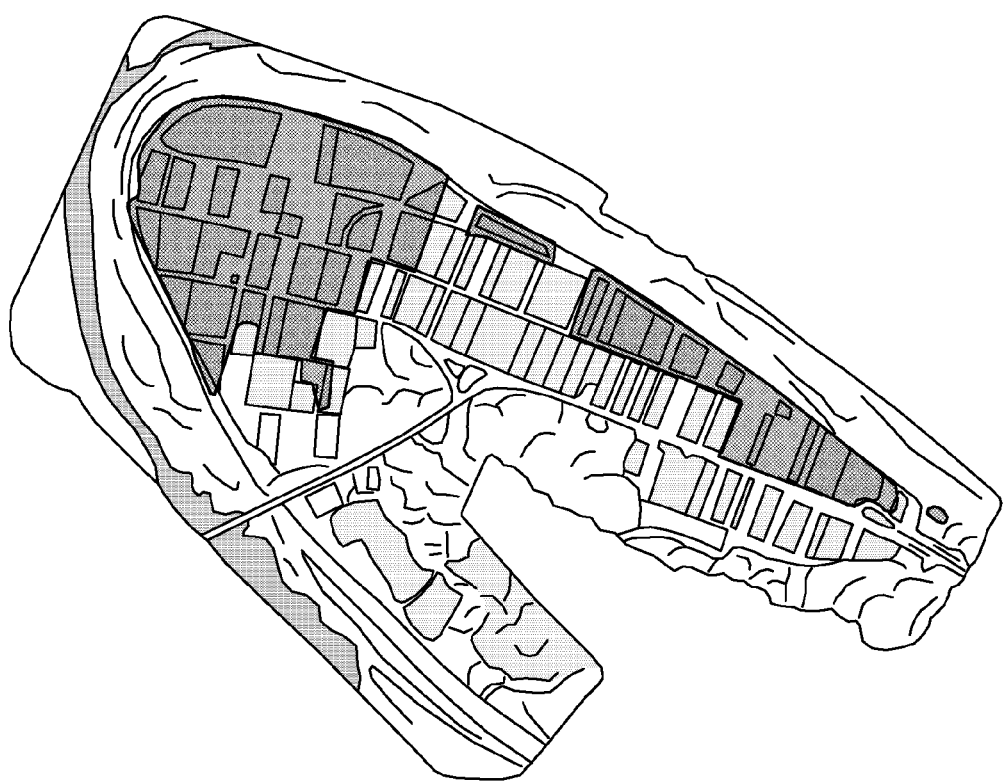

[Figure 8c]
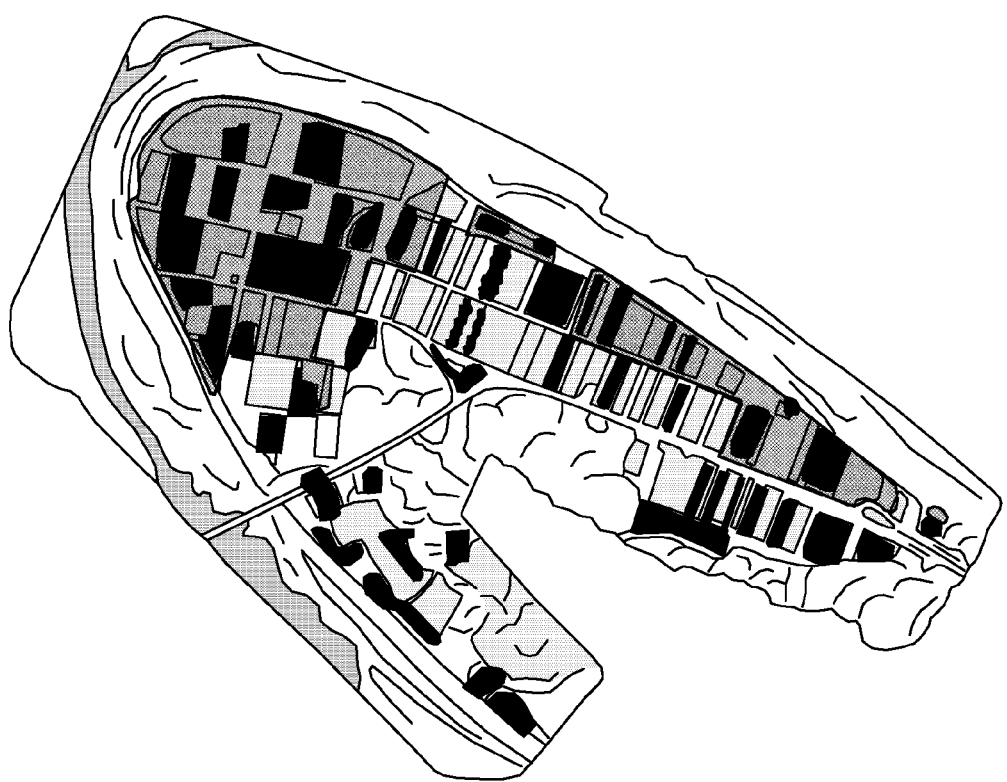

【Figure 9a】
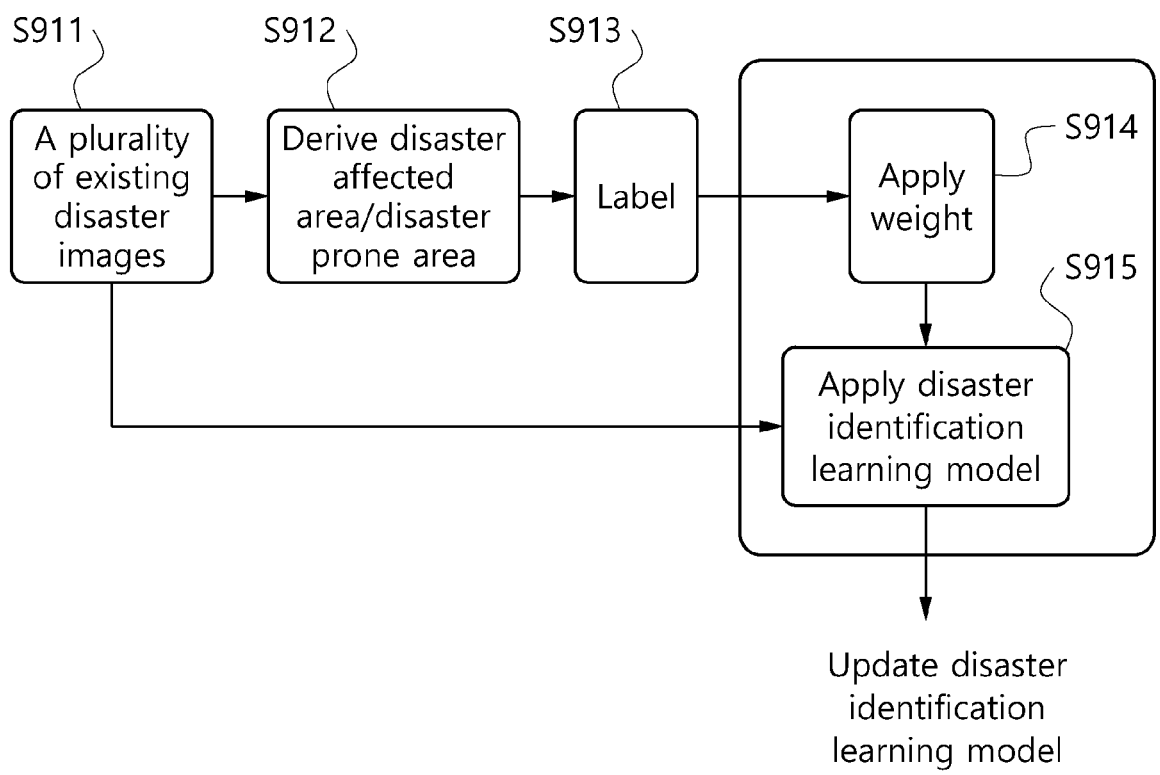

[Figure 9b]
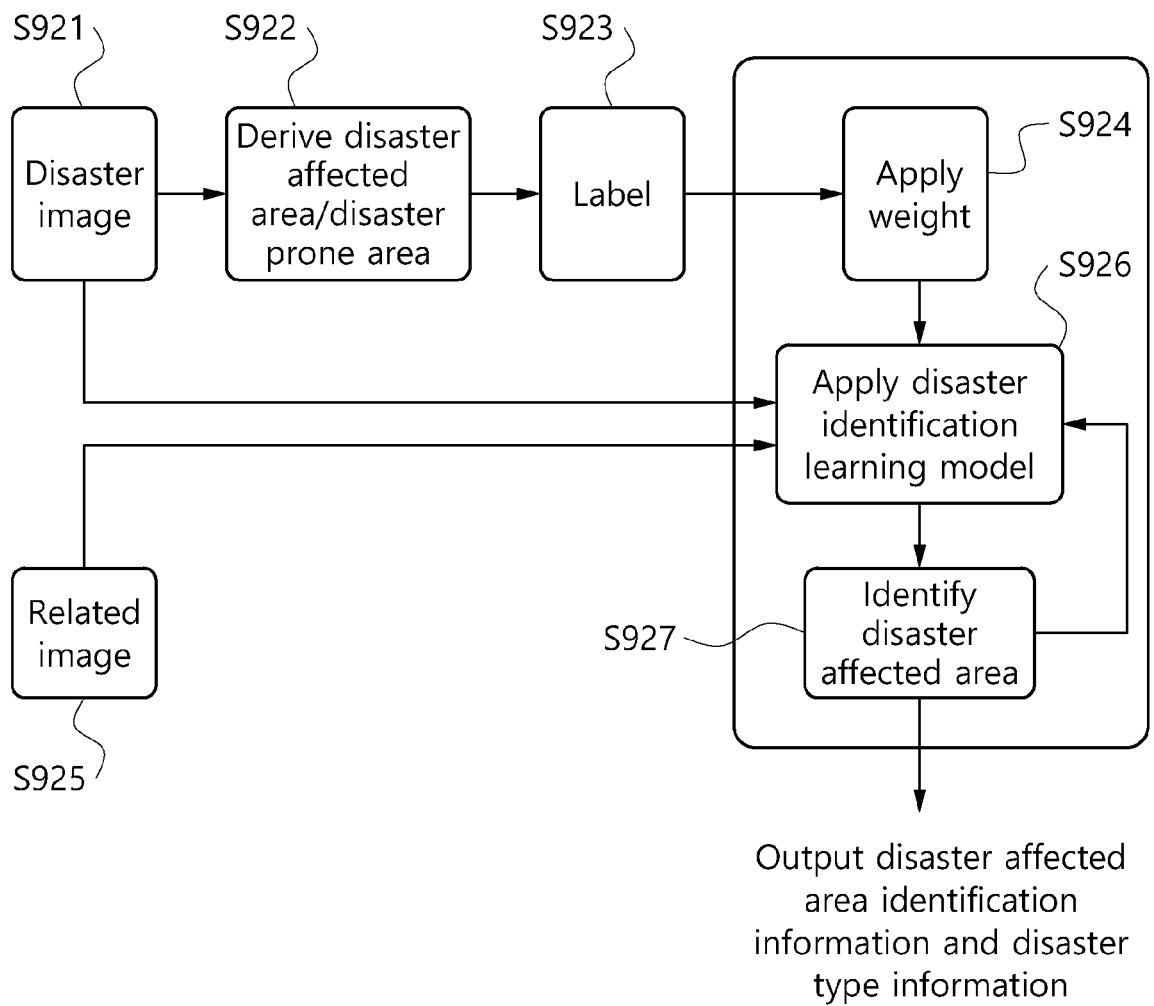

【Figure 10】
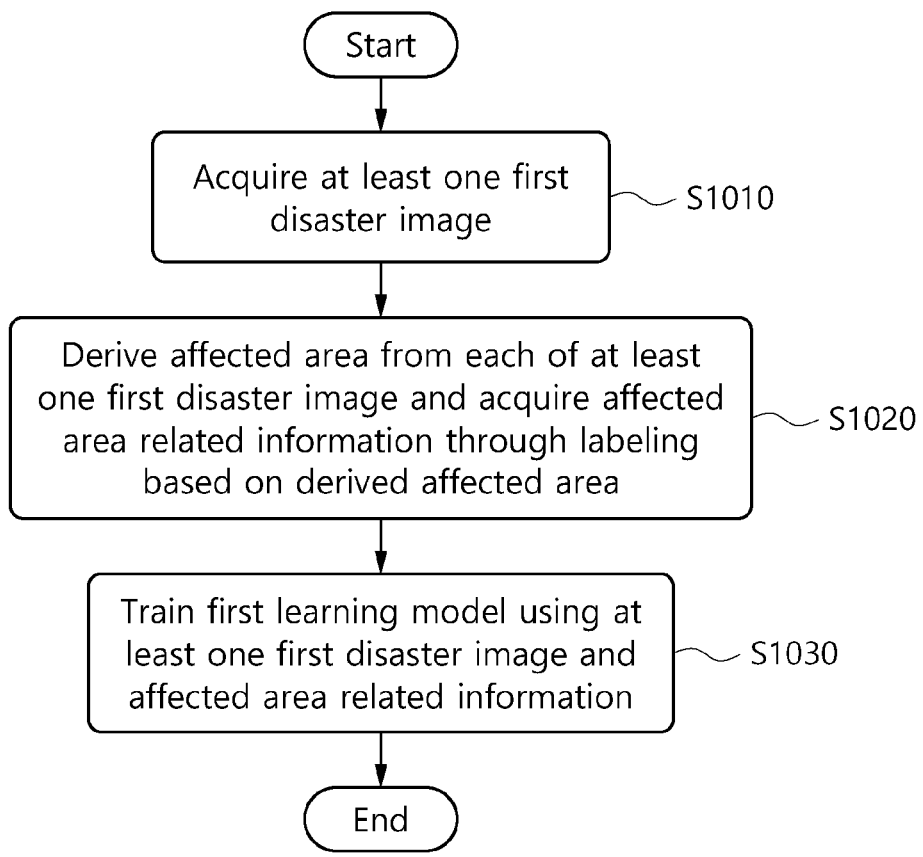

METHOD AND APPARATUS FOR IDENTIFYING DISASTER AFFECTED AREAS USING DISASTER PRONE AREAS FEATURES

TECHNICAL FIELD

Embodiments relate to a method and apparatus for identifying disaster affected areas using disaster prone area features. More particularly, embodiments relate to a method and apparatus for identifying disaster damage using disaster affected areas and disaster prone area information.

BACKGROUND

When damage occurs due to disasters, for example, natural disasters, it may require lots of manual labor to identify disaster damage. Additionally, there may be limitations on identifying all information by manual labor in accurately investigating and calculating the size of the disaster damage. In view of the foregoing description, there has been a significant development in technologies for acquiring disaster damage information by analyzing aerial images of disaster affected areas captured by drones or satellites. However, even though the aerial images of the disaster affected areas are acquired using drones or satellites, there are limitations on identifying disaster damage only using the images. Above all, disaster damage images are aerial images that roughly shows disaster damage and they do not contain detailed information associated with disaster damage, so there may be limitations on identifying detailed disaster damage information. In view of the foregoing description, below is a description of a method for identifying disaster affected areas by analyzing the features of not only the disaster affected areas but also disaster prone areas through aerial images and further analyzing additional information associated with the features of the disaster prone areas based on Artificial Intelligence (AI).

SUMMARY

The present disclosure relates to a method and apparatus for identifying disaster affected areas using disaster prone area features.

The present disclosure may provide a method and apparatus that extracts feature information from disaster prone areas and identifies disaster affected areas using the extracted feature information together with disaster prone area information.

The present disclosure may provide a method and apparatus for identifying disaster affected areas through learning based on disaster affected area information and the feature information extracted from the disaster prone areas.

The present disclosure may provide a method and apparatus for outputting the range of disaster affected areas and the type of disaster damage to the input of disaster affected area images.

The technical problem of the present disclosure is not limited to the foregoing description, and may be expanded to various matters that may be derived by the embodiments of the present disclosure described below.

According to an embodiment of the present disclosure, there may be provided an operation method of a server for identifying disaster affected areas. In this instance, the operation method of the server may include acquiring at least one first disaster image, deriving a disaster affected area from each of the at least one first disaster image, acquiring affected area related information through labeling based on the derived disaster affected area, and training a first learning model using the at least one first disaster image and the affected area related information.

Additionally, according to an embodiment of the present disclosure, there may be provided a server for identifying disaster affected areas. In this instance, the server may include a transmitter/receiver to communicate with an external device, and a processor to control the transmitter/receiver. In this instance, the processor may be configured to acquire at least one first disaster image, derive a disaster affected area from each of the at least one first disaster image, acquire affected area related information through labeling based on the derived disaster affected area, and train a first learning model using the at least one first disaster image and the affected area related information.

Additionally, the following description may be equally applied to the operation method of the server for identifying disaster affected areas and the server.

Additionally, according to an embodiment of the present disclosure, the operation method of the server may further include deriving a plurality of disaster prone areas based on the derived disaster affected area in each of the at least one first disaster image, and acquiring disaster prone area related information for each of the plurality of derived disaster prone areas based on labeling, and the first learning model may be trained further using the disaster prone area related information for each of the plurality of derived disaster prone areas.

Additionally, according to an embodiment of the present disclosure, the disaster prone area related information for each of the plurality of derived disaster prone areas may include feature information for each of the plurality of disaster prone areas, and the feature information may be information which is set considering a relationship between each of the plurality of disaster prone areas and the disaster affected area.

Additionally, according to an embodiment of the present disclosure, the operation method of the server may include acquiring a second disaster image from the external device, deriving a disaster affected area and a disaster prone area from the second disaster image, acquiring a plurality of disaster related information through labeling based on the derived disaster affected area and the derived disaster prone area, assigning a weight to each of the plurality of acquired disaster related information, inputting the second disaster image and the plurality of disaster related information to the trained first learning model, and outputting disaster affected area identification information and disaster damage type information based on the first learning model.

Additionally, according to an embodiment of the present disclosure, the operation method of the server may further include acquiring at least one related image related to the second disaster image, and the at least one related image may be inputted to the first learning model together with the second disaster image and the plurality of disaster related information.

Additionally, according to an embodiment of the present disclosure, the at least one related image may include at least one of a pre-disaster image, a neighborhood image, a map image or a geographical image.

Additionally, according to an embodiment of the present disclosure, the second disaster image may be inputted to a second learning model, and the second learning model may derive the disaster affected area and the disaster prone area of the second disaster image, and provide the plurality of disaster related information as output information through the labeling based on the derived disaster affected area and the derived disaster prone area.

Additionally, according to an embodiment of the present disclosure, the server may receive damage propagation information for each of the derived disaster affected area and the derived disaster prone area, the weight for each of the plurality of acquired disaster related information may be determined further reflecting the damage propagation information, and the damage propagation information may be numericalized information considering a disaster occurrence probability.

Additionally, according to an embodiment of the present disclosure, the server may receive external data related to the first disaster image and the second disaster image from a network or the external device, assign the weight and provide as the input of the first learning model.

Additionally, according to an embodiment of the present disclosure, the server may acquire the external data from a disaster statistical database, the server may identify a disaster type based on the first disaster image and the second disaster image, extract at least one information corresponding to the disaster type from the disaster statistical database and acquire the at least one information as the external data, and the at least one information may include at least one of damage size information, damage frequency information, damage cost information, human loss information, damage cause information or fault related information.

The present disclosure may provide a method for identifying disaster affected areas using disaster prone area features.

The present disclosure extracts feature information from disaster prone areas and identifies disaster affected areas using the extracted feature information together with disaster prone area information.

The present disclosure identifies disaster affected areas through learning based on disaster affected area information and the feature information extracted from the disaster prone areas.

The present disclosure outputs the range of disaster affected areas and the type of disaster damage to the input of disaster affected area images.

The present disclosure is not limited to the foregoing description, and may be expanded to various matters that may be derived by the embodiments of the present disclosure described below.

BRIEF DESCRIPTION OF THE DRAWINGS

FIG. 1 is a diagram showing an example of an operating environment of a system according to an embodiment of the present disclosure.

FIG. 2 is a block diagram illustrating the internal configuration of a computing device 200 in an embodiment of the present disclosure.

FIG. 3A is a diagram showing a method for acquiring a disaster image in an embodiment of the present disclosure.

FIG. 3B is a diagram showing a method for acquiring a disaster image in an embodiment of the present disclosure.

FIG. 3C is a diagram showing a method for acquiring a disaster image in an embodiment of the present disclosure.

FIG. 4 is a diagram showing a method for labeling a disaster image in an embodiment of the present disclosure.

FIG. 5A is a diagram showing a method for identifying a disaster affected area and a disaster prone area in an embodiment of the present disclosure.

FIG. 5B is a diagram showing a method for identifying a disaster affected area and a disaster prone area in an embodiment of the present disclosure.

FIG. 5C is a diagram showing a method for identifying a disaster affected area and a disaster prone area in an embodiment of the present disclosure.

FIG. 6 is a diagram showing a method for extracting the features of a disaster prone area in an embodiment of the present disclosure.

FIG. 7A is a diagram showing a method for acquiring a disaster related image in an embodiment of the present disclosure.

FIG. 7B is a diagram showing a method for acquiring a disaster related image in an embodiment of the present disclosure.

FIG. 7C is a diagram showing a method for acquiring a disaster related image in an embodiment of the present disclosure.

FIG. 8A is a diagram showing a method for acquiring a disaster related image in an embodiment of the present disclosure.

FIG. 8B is a diagram showing a method for acquiring a disaster related image in an embodiment of the present disclosure.

FIG. 8C is a diagram showing a method for acquiring a disaster related image in an embodiment of the present disclosure.

FIG. 9A is a diagram showing a method for building a learning model based on disaster images in an embodiment of the present disclosure.

FIG. 9B is a diagram showing a method for building a leaning model based on disaster images in an embodiment of the present disclosure.

FIG. 10 is a flowchart showing a method for identifying a disaster affected area in an embodiment of the present disclosure.

DETAILED DESCRIPTION OF THE EMBODIMENTS

In describing an embodiment of the present disclosure, when a certain detailed description of well-known elements or functions is determined to make the subject matter of an embodiment of the present disclosure ambiguous, the detailed description is omitted. Additionally, in the drawings, elements irrelevant to the description of an embodiment of the present disclosure are omitted, and like reference signs are affixed to like elements.

In an embodiment of the present disclosure, when an element is referred to as being "connected", "coupled" or "linked" to another element, this may include not only a direct connection relationship but also an indirect connection relationship in which intervening elements are present. Additionally, unless expressly stated to the contrary, "comprise" or "include" when used in this specification, specifies the presence of stated elements but does not preclude the presence or addition of one or more other elements. In an embodiment of the present disclosure, the terms "first", "second" and the like are used to distinguish an element from another, and do not limit the order or importance between elements unless otherwise mentioned. Accordingly, a first element in an embodiment may be referred to as a second element in other element within the scope of embodiments of the present disclosure, and likewise, a second element in an embodiment may be referred to as a first element in other embodiment.

In an embodiment of the present disclosure, the distinguishable elements are intended to clearly describe the feature of each element, and do not necessarily represent the separated elements. That is, a plurality of elements may be integrated into one hardware or software, and an element may be distributed to multiple hardware or software. Accordingly, although not explicitly mentioned, the integrated or distributed embodiment is included in the scope of embodiments of the present disclosure.

In the specification, a network may be a concept including a wired network and a wireless network. In this instance, the network may refer to a communication network that allows data exchange between a device and a system and between devices, and is not limited to a particular network.

The embodiment described herein may have aspects of entirely hardware, partly hardware and partly software, or entirely software. In the specification, "unit", "apparatus" or "system" refers to a computer related entity such as hardware, a combination of hardware and software, or software. For example, the unit, module, apparatus or system as used herein may be a process being executed, a processor, an object, an executable, a thread of execution, a program and/or a computer, but is not limited thereto. For example, both an application running on a computer and the computer may correspond to the unit, module, apparatus or system used herein.

Additionally, the device as used herein may be a mobile device such as a smartphone, a tablet PC, a wearable device and a Head Mounted Display (HMD) as well as a fixed device such as a PC or an electronic device having a display function. Additionally, for example, the device may be an automotive cluster or an Internet of Things (IoT) device. That is, the device as used herein may refer to devices on which the application can run, and is not limited to a particular type. In the following description, for convenience of description, a device on which the application runs is referred to as the device.

In the present disclosure, there is no limitation in the communication method of the network, and a connection between each element may not be made by the same network method. The network may include a communication method using a communication network (for example, a mobile communication network, a wired Internet, a wireless Internet, a broadcast network, a satellite network, etc.) as well as near-field wireless communication between devices. For example, the network may include all communication methods that enable networking between objects, and is not limited to wired communication, wireless communication, 3G, 4G, 5G, or any other methods. For example, the wired and/or wireless network may refer to a communication network by at least one communication method selected from the group consisting of Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VOIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (Wi-MAX) or communication using ultrasonic waves, but is not limited thereto.

The elements described in a variety of embodiments are not necessarily essential, and some elements may be optional. Accordingly, an embodiment including some of the elements described in the embodiment is also included in the scope of embodiments of the present disclosure. Additionally, in addition to the elements described in a variety of embodiments, an embodiment further including other elements is also included in the scope of embodiments of the present disclosure.

Hereinafter, the embodiments of the present disclosure will be described in detail with reference to the accompanying drawings.

FIG. 1 is a diagram showing an example of an operating environment of a system according to an embodiment of the present disclosure. Referring to FIG. 1, a user device 110 and at least one server 120, 130, 140 are connected via a network 1. FIG. 1 is provided by way of illustration, and the number of user devices or servers is not limited to FIG. 1.

The user device 110 may be a fixed or mobile terminal incorporated into a computer system. The user device 110 may include, for example, a smartphone, a mobile phone, a navigation, a computer, a laptop computer, a digital broadcasting terminal, a Personal Digital Assistant (PDA), a Portable Multimedia Player (PMP), a tablet PC, a game console, a wearable device, an IoT device, a virtual reality (VR) device and an augmented reality (AR) device. For example, in embodiments, the user device 110 may substantially refer to one of a variety of physical computer systems that can communicate with the servers 120-140 via the network 1 using a wireless or wired communication method.

Each server may be incorporated into a computer device or a plurality of computer devices capable of providing commands, code, files, content and services by communication with the user device 110 via the network 1. For example, the server may be a system that provides each service to the user device 110 having accessed via the network 1. In a more specific example, the server may provide an intended service (for example, information provision) of an application as a computer program installed and running on the user device 110 to the user device 110 through the corresponding application. In another example, the server may distribute a file for installing and running the above-described application to the user device 110, receive user input information and provide a corresponding service. In an example, in the following description, each server may operate based on any one of the servers of FIG. 1. The server may be a subject that communicates with at least one of another device, a drone, a satellite or an airplane via the network and acquires data. Additionally, the terminal that receives disaster damage identification information may be one of the users of FIG. 1. In another example, the drone, satellite and airplane may communicate with another terminal or server based on the network of FIG. 1. That is, the subjects may operate in a manner of communicating with each other via the network and exchanging data, and is not limited to the above-described embodiment.

FIG. 2 is a block diagram illustrating the internal configuration of a computing device 200 in an embodiment of the present disclosure. The computing device 200 may be applied to the at least one user device 110-1, 110-2 or server 120-140 described above with reference to FIG. 1, and each device and each server may have identical or similar internal configuration by adding or removing some components.

Referring to FIG. 2, the computing device 200 may include a memory 210, a processor 220, a communication module 230 and a transmitter/receiver 240. The memory 210 is a non-transitory computer-readable recording medium, and may include a permanent mass storage device such as random access memory (RAM), read only memory (ROM), disk drive, solid state drive (SSD) and flash memory. Here, the permanent mass storage device such as ROM, SSD, flash memory and disk drive is a separate permanent storage device that is different from the memory 210, and may be included in the above-described device or server. Additionally, the memory 210 may store an operating system and at least one program code (for example, code for a browser installed and running on the user device 110 or an application installed in the user device 110 to provide a specific service). These software components may be loaded from a separate computer-readable recording medium other than the memory 210. The separate computer-readable recording medium may include a computer-readable recording medium such as a floppy drive, a disc, a tape, a DVD/CD-ROM drive and a memory card.

In another embodiment, the software components may be loaded on the memory 210 through the communication module 230, not the computer-readable recording medium. For example, at least one program may be loaded on the memory 210 based on the computer program (for example, the above-described application) installed by files provided via the network 1 by developers or file distribution systems (for example, the above-described servers) which distribute application installer files.

The processor 220 may be configured to process the instructions of the computer program by performing the basic arithmetic, logical and input/output calculation. The instructions may be provided to the processor 220 by the memory 210 or the communication module 230. For example, the processor 220 may be configured to execute the received instructions according to the program code stored in the recording device such as the memory 210.

The communication module 230 may provide a function for communication between the user device 110 and the server 120-140 via the network 1, and may provide a function for communication between each of the device 110 and/or the server 120-140 and another electronic device.

The transmitter/receiver 240 may be a means for interfacing with an external input/output device (not shown). For example, the external input device may include a keyboard, a mouse, a microphone and a camera, and the external output device may include a display, a speaker and a haptic feedback device.

In another example, the transmitter/receiver 240 may be a means for interfacing with a device having an integrated function for input and output such as a touch screen.

Additionally, in other embodiments, the computing device 200 may include a larger number of components than the components of FIG. 2 depending on the nature of devices to which the computing device 200 is applied. For example, when the computing device 200 is applied to the user device 110, the computing device 200 may include at least some of the above-described input/output devices, or may further include other components such as a transceiver, a Global Positioning System (GPS) module, a camera, various types of sensors and a database. In a more specific example, when the user device is a smartphone, the computing device 200 may further include a variety of components commonly included in the smartphone such as an acceleration sensor or a gyro sensor, a camera module, various types of physical buttons, buttons using a touch panel, an input/output port and a vibrator for vibration.

In an example, in the following description, the terminal, drone, satellite and airplane may be devices that operate based on FIG. 2. That is, the terminal, drone, satellite and airplane as described below may be subjects that connect to and communicate with the server via the network based on FIG. 1.

Here, each subject may be a computing device that operates, including the memory, the processor, the communication module and the transmitter/receiver based on FIG. 2 and any other components, and may not be limited to a particular computing device.

In an example, when disasters (for example, deluge, fire, earthquake overflow, flood, collapse, etc.) occur, images or videos of areas at which the disasters occurred may be acquired using at least one of the drone, the satellite or the airplane. That is, at least one of the drone, the satellite or the airplane may capture the images of the areas at which the disasters occurred, and transmit the images to the server. The server may identify disaster affected areas and the types of disaster damage through the received images. In this instance, the server may include a disaster identification learning model, and the received images (or videos, hereinafter referred to as the images) may be applied to the disaster identification learning model as the input, and disaster affected area identification information and disaster damage type information may be provided as the output of the disaster identification learning model. In an example, the server may provide the disaster affected area identification information and the disaster damage type information to the terminal or the device, and the terminal and the device may use the received information.

However, in an example, learning through a large amount of data may be necessary for the disaster identification learning model to accurately identify the disaster affected areas and the types of disaster damage. However, since disasters do not often occur, insufficient data of disaster images may be the hurdle for learning. Additionally, in an example, learning based on the disaster identification learning model needs to reflect the features of disaster affected areas and disaster prone areas, thereby increasing accuracy in identifying affected areas.

In view of the foregoing description, below is a description of the advanced method of the disaster identification learning model that outputs the range of disaster areas and the type of disaster damage to the input of disaster images as aerial images.

Here, in an example, the disaster images may be aerial images. More specifically, referring to FIG. 3A, the server 310 may acquire the aerial image of the disaster area from the drone 320. In an example, the drone is a small flying object and can freely fly in the air to acquire the disaster image as the aerial image. Additionally, the server 310 may be a device including the disaster identification learning model to identify disaster affected areas, but is not limited to a particular type.

In another example, referring to FIG. 3B, the server 310 may acquire the aerial image of the disaster area from the satellite 330. In another example, referring to FIG. 3C, the aerial image may be an image acquired through the airplane 330. Here, in an example, the server 310 may acquire the disaster image through at least one of FIGS. 3A to 3C, and is not limited to a particular type. Additionally, the server 310 may acquire a plurality of disaster images through a plurality of devices, and may use the plurality of disaster images. Additionally, in an example, the server 310 may acquire disaster images in other formats from other devices. In an example, the server 310 may acquire images in other formats for the same area as the affected area at which the disaster images are captured as the aerial images. Here, the images in other formats may be close-up images of the affected area, map images, geographical images or any other images, and is not limited to a particular type.

That is, the server 310 may acquire the aerial images as the disaster images based on FIGS. 3A to 3C, and may acquire the images in other formats through other devices or a database, and is not limited to the above-described embodiment.

Here, the disaster identification learning model of the server may derive and provide disaster affected area identification information and disaster damage type information as an output value to the input of the at least one disaster image acquired through the foregoing description.

However, since disasters do not often occur as described above, sample data for training the disaster identification learning model may be insufficient. Additionally, to provide an accurate output value for the disaster images, it is necessary to reflect domestic geographical information or any other feature information on the disaster identification learning model as described above.

In view of the foregoing description, the disaster identification learning model may be pre-trained based on a plurality of existing disaster images. That is, the disaster identification learning model may be built as a learning model for identifying disaster affected areas through training using the existing disaster images as sample data.

However, in an example, when the disaster identification learning model is only trained with the disaster images as the input, sample data may be insufficient, resulting in limited advanced learning. In view of the foregoing description, the disaster images may be labelled, and labeling information may be used as the input of the disaster identification learning model. In another example, disaster affected area information and disaster prone area information may be extracted from the disaster images and used as the input of the disaster identification learning model.

Here, in an example, referring to FIG. 4, the labeling of the disaster image may be performed in relation to the disaster affected area in the disaster image. That is, the disaster affected area may be derived from the disaster image, and a plurality of damage related information may be generated through labeling based on the derived affected area.

In an example, referring to FIG. 4, the plurality of damage related information generated through labeling in relation to the disaster image may include at least one of affected area information, damage type information, neighborhood feature information, damage propagation information, weather information at the time of the disaster or any other information.

In an example, the disaster image may be an image related to the past disaster as described above. That is, the damage related information acquired through labeling may exist as record information related to the past disaster image. The server may acquire the above-described disaster image related record information, and perform labelling for each disaster image based on the same. Here, each of the labeled disaster image and the labeling information may be used as input data for advanced training of the above-described disaster identification learning model.

In this instance, the disaster identification learning model may be trained with the plurality of disaster images and the damage related information acquired through labeling as the input. When the disaster identification learning model is trained, the disaster identification learning model may perform matching between the disaster image and the damage related information acquired through labeling and perform weighting for each damage related information. In a more specific example, the disaster identification learning model may identify the damage related information through labeling of the disaster images occurred at or above 30° C. in the summer among the plurality of disaster images, and derive common and specific information for each disaster based on the corresponding information. Subsequently, the disaster identification learning model may be trained based on a process of matching the derived common and specific information to each disaster image.

Here, in an example, the server may use an information derivation learning model to derive the affected areas from the existing disaster images and generate the damage related information through labeling. That is, the server may include another learning model that is different from the disaster identification learning model. Here, the information derivation learning model may output the affected area and the damage related information through labeling for each disaster image to the input of each existing disaster image.

Subsequently, the server may use the disaster affected area and the damage related information derived through the information derivation learning model as the input information of the disaster identification learning model together with the disaster images. The disaster identification learning model may provide the disaster affected area identification information and the disaster damage type information as the output information based on the above-described input information.

In another example, the advanced training of the disaster identification learning model may be performed by deriving the disaster affected area and the disaster prone area adjacent to the disaster affected area from the disaster image, and acquiring the information through labeling based on the same as described above. In an example, the disaster affected area and the disaster prone area may be derived from the disaster image to train the disaster identification learning model. In this instance, damage type information (for example, flood, landslide) of the disaster affected area and neighborhood feature information (for example, hill, forest, pine tree, valley, bridge, paddy field, ginseng farm) adjacent to the disaster affected area may be derived through labeling, and the corresponding information may be used as training data.

More specifically, FIGS. 5A to 5C are diagrams showing a method for identifying the disaster affected area and the disaster prone area in an embodiment of the present disclosure. Referring to FIGS. 5A and 5B, the disaster affected area 510 and the disaster prone area 520 may be derived from the disaster image. In an example, the server may derive the disaster affected area 510 and the disaster prone area 520, 530 through the above-described information derivation learning model. In a specific example, in FIGS. 5A and 5B, the disaster affected area 510 may be a flood affected area and the disaster damage type information may be flooding. However, this is provided by way of illustration, and any other disaster damage may be contemplated. In this instance, in an example, the server may derive feature information of each of the disaster affected area 510 and the disaster prone area 520, 530 through labeling. Here, the disaster prone area 520, 530 may be a plurality of areas, and each disaster prone area 520, 530 may include each feature information. In an example, the first disaster prone area 520 may be a river or stream adjacent to the area at which the flood occurred, and the feature information of the first disaster prone area 520 may be derived based on labeling. Here, the feature information of the first disaster prone area 520 may be information generated in relation to the flood as the disaster affected area 510. That is, the feature information may be derived considering the relevance of the flood to the river or stream. Additionally, the second disaster prone area 520 may be an adjacent road, and the feature information of the second disaster prone area 520 may be generated as information considering the relevance to the flood. Based on the foregoing description, not only the feature information of the disaster affected area 510 but also the feature information of the disaster prone areas 520, 530 may be reflected on the training data.

In an example, at least one of shape, area or direction information of the river or stream as the feature information of the first disaster prone area 520 which is the river or stream may be included as the training data. That is, the information related to the first disaster prone area 520 may be included as the training data. Additionally, elevation comparison information and geographical shape comparison information between the second disaster prone area 530 and the disaster affected area 510, pavement information and any other information as the feature information of the second disaster prone area 530 which is the road near the river or stream may be included as the training data. That is, the training data may include the information associated with the disaster affected area 510 and the derived feature information having the relevance to the disaster affected area 510 as the information associated with the disaster prone areas 520, 530 adjacent to the disaster affected area 510.

In a more specific example, referring to FIG. 5C, in addition to the first disaster prone area 520 and the second disaster prone area 530, third disaster prone area 540, fourth disaster prone area 550 and fifth disaster prone area 560 information may be used as the training data. Here, the third disaster prone area 540 may be a building adjacent to the disaster affected area 510, and information related to the building and flood damage may be added as feature information of the third disaster prone area 540. In an example, the feature information of the third disaster prone area 540 may be building damage information at the time of the flood affected area 510. In contrast, the fourth disaster prone area 550 may be an agricultural land, and information related to the agricultural land and the flood may be included as feature information. In an example, the feature information may include at least one of the shape of the agricultural land, the crop type in the agricultural land, geographical elevation or comparison information with the disaster affected area.

Additionally, the fifth disaster prone area 560 may include feature information having the relevance to the disaster affected area 510 which is a greenhouse. That is, the training data may further include information related to each of the disaster prone areas 510, 520, 530, 540, 550, and training may be performed based on the same.

In another example, the training data may further include affected area related information. In an example, referring to FIG. 6, the feature information of the disaster affected area 610 and the disaster prone area 620 may be derived and reflected on the training data as described above. In an example, in FIG. 6, the disaster affected area 610 may be a flood affected area. In this instance, disaster related information may be additionally reflected on a disaster related learning model as the affected area related information. In an example, for the disaster related information, water flow information 630 and soil flow information 640 may be derived and reflected. In an example, the water flow information 630 and the soil flow information 640 is information having the relevance to the affected area 610 and the flood that caused the disaster, and may be measured at a location or a plurality of locations at a preset distance from the affected area 610, and these information may be reflected on the training data. That is, not only the affected area information and the disaster prone area feature information but also the disaster related information may be reflected as the training data, and training may be performed based on the same.

FIG. 6 illustrates the flood affected area, but is not limited thereto. That is, in addition to the information related to the disaster affected area and the disaster prone area, the training data may further include the related information associated with the disaster, and is not limited to the above-described embodiment.

In another example, the disaster related information may include damage propagation information. Here, the damage propagation information may be a value that is pre-determined depending on the disaster affected area or the disaster prone area. In a specific example, in case that the disaster prone area adjacent to the disaster affected area is a sea wall or a forest area, the probability of damage propagation is low, so the damage propagation value may be set to a low value. In contrast, in the case of a greenhouse, a power plant, a reservoir or a raw land, a disaster may cause significant damage when it occurs, so the damage propagation value of the corresponding areas may be set to a large value. That is, the damage propagation information may be pre-determined based on the features of each of the disaster affected area or the disaster prone area, and the corresponding information may be reflected on the training data as the disaster related information.

In another example, as described above, when the learning model is trained with the derived information as the training data, weights may be assigned to each information. In an example, the weights may be assigned based on the influence on damage as the information related to the damage. In a specific example, the weights may be assigned to the slope in geography, the shape of the river or stream and the depth of water in the river or stream, in order to identify and compare the slope, the shape of the river or stream and the depth of water in the river or stream with priority among the input data, thereby increasing accuracy of damage determination. Based on the foregoing description, the disaster identification learning model may be trained based on at least one of the disaster image, the feature information of the disaster affected area and the disaster prone area acquired through labeling or the disaster related information.

Subsequently, when a disaster actually occurs, disaster images may be acquired based on FIGS. 3A to 3C as described above, the disaster identification learning model may calculate disaster affected area identification information and disaster damage type determination information as the output information to the input of the acquired disaster images.

In this instance, in an example, landmark information may be extracted from the disaster images used as the input information of the disaster identification learning model. Here, the landmark information may be information associated with the neighborhood features adjacent to the disaster affected area as described above. In a more specific example, referring to FIGS. 5A to 5C, at least one information of the shape and area of the river or stream, the direction of the river or stream, the shape/geographical elevation of the agricultural land on the left side of the flood affected area, the purpose of use (a paddy field, a dry field, or an apple farm, etc.) of the flood affected area or the purpose of use (a paddy field, a dry field, a greenhouse, etc.) of areas adjacent to the flood prone area may be extracted. Here, in an example, the extraction of the landmark information as described above may be performed based on the above-described information derivation learning model as another learning model.

That is, when the server acquires the disaster images that need to be analyzed, the server may extract the disaster affected area, the disaster prone area and the disaster related information as described above by applying the learning model for extracting the landmark information to the disaster images. Subsequently, the server may use the disaster images and the information extracted based on the foregoing description as the input information of the disaster identification learning model, and calculate the disaster affected area identification information and the disaster damage type determination information as the output information through the disaster identification learning model, thereby increasing the learning accuracy.

In another example, for the advanced learning to identify the disaster affected area, pre-disaster images may be acquired in relation to the disaster images. In an example, the server may acquire the pre-disaster images from another database or another device. In another example, the server may further acquire map images and images in any other formats in relation to the disaster images and use the images as the input information of the above-described disaster identification learning model, thereby increasing accuracy.

In an example, referring to FIGS. 7A to 7C, FIG. 7A may be a disaster image, and FIG. 7B may be a pre-disaster image. Additionally, FIG. 7C may be an image captured at a different angle. Here, each image may display the disaster affected area and the disaster prone area 710 that may be compared with each other. Additionally, each of the above-described images may be used as the input information of the disaster identification learning model, thereby increasing accuracy of an output value.

In another example, post-disaster images of the disaster affected area may be used as the input. In an example, after the flood affected area is drained, crop damage exists but may not be displayed on the image. Additionally, in an example, in the case of a greenhouse area, when it looks like the greenhouse is not deformed, it may be determined that there is no damage, so it is necessary to use the post-disaster images or any other images as the input.

In another example, referring to FIGS. 8A to 8C, map information displaying geographical information and specific information related to the disaster affected area may be further used. In an example, FIG. 8A may be a numerical geographical modeling image, and FIG. 8B may be an image of the flood affected area (blue). Additionally, in an example, FIG. 8C may be an image showing flood damage (red) of ginseng which is the cultivated crop as the specific information. In this instance, the above-described images may be used as the input information.

Additionally, in the case of the aerial image, geographical information (elevation) may not be reflected. In view of the foregoing description, cadastral map images including geographical information may be further used as the input information, and based on the foregoing description, it is possible to increase accuracy of an output value.

Through the foregoing description, the server may derive and provide affected area identification information and damage type information in the disaster images through the disaster identification learning model. Here, the affected area identification information and the damage type information may be information displaying the affected area on the disaster images. Additionally, in an example, the affected area identification information and the damage type information may further include the damage related information based on the affected area. In an example, when an agricultural land loss occurs due to flooding, the lost agricultural land area may be displayed, and crop damage information of the lost agricultural land may be included. That is, the affected area identification information and the damage type information may include not only information associated with the affected area but also damage related information.

FIG. 9A is a diagram showing a method for building the learning model based on the disaster images in an embodiment of the present disclosure.

Referring to FIG. 9A, the server may train the disaster identification learning model through the plurality of existing disaster images. Here, the server may acquire the plurality of existing disaster images (S911). In this instance, the disaster affected area and the disaster prone area may be derived from the plurality of existing disaster images. In an example, the server may derive the disaster affected area and the disaster prone area from the disaster images through the information derivation learning model as described above (S912). Subsequently, the feature information of each of the derived disaster affected area and disaster prone area may be derived through labeling (S913). Here, labeling and feature information derivation may be performed based on the above-described information derivation learning model, and is not limited to the above-described embodiment. In an example, as described above, in the case of the existing disaster images, the damage related information associated with the disaster may be preset, labeling may be performed in relation to the disaster affected area and the disaster prone area based on the corresponding information, and the feature information may be derived. Here, the feature information derived based on labeling may include at least one of the affected area information, the damage type information, the neighborhood feature information, the damage propagation information, the weather information at the time of the disaster or date information based on each disaster image as shown in FIG. 4. In this instance, the feature information may be used to train the disaster identification learning model together with the disaster images. Subsequently, the weights may be applied to the labeling information and the disaster affected area/disaster prone area information described above (S914). In this instance, in an example, the weights may be differently set for each information. In another example, the weights may be set reflecting the above-described damage propagation information, and are not limited to the above-described embodiment. Subsequently, the server may train the disaster identification learning model using each disaster image, the labeling information and the disaster affected area/disaster prone area information, and through this, may update the disaster identification learning model (S915).

Additionally, referring to FIG. 9B, the server may analyze the real disaster images using the updated disaster identification learning model, and derive the disaster affected area identification information and the disaster damage type information based on the same. More specifically, the server may acquire the disaster images as aerial images based on FIGS. 3A to 3C (S921). In this instance, the disaster affected area and the disaster prone area may be derived from each disaster image. In an example, the server may derive the disaster affected area and the disaster prone area based on the information derivation learning model as the landmark information, and acquire the feature information through labeling (S923). Subsequently, weighting may be applied to each extracted information (S924), and the weighted information may be used as the input information of the updated disaster identification learning model. Additionally, in an example, in addition to the disaster images, the server may further acquire at least one of pre-disaster images, neighborhood images, map images, geographical images or any other related images (S925). In this instance, as described above, the server may apply the weighted information, the disaster images and any other related images to the disaster identification learning model as the input (S926). The disaster identification learning model may identify the disaster affected area based on the trained database based on the above-described input information, and derive the related information (S927). Subsequently, the disaster identification learning model may provide the disaster affected area identification information and the disaster damage type information as the output information, thereby increasing accuracy in identifying the disaster affected area in the disaster images.

Additionally, in an example, the server may further reflect external data on the disaster identification learning model. That is, the server may receive the external data, assign the weights and train the learning model based on the same. Additionally, the weighted external data may be applied to the learning model and used in the process of deriving the output, and is not limited to the above-described embodiment.

Here, the external data may be information that the server acquires from the network or the external device, and is not limited to a particular type. However, in an example, the external data may be information related to the disaster images and the related images. In a more specific example, the server may acquire the external data from a disaster statistical database. That is, the external data may be information acquired from the database including disaster related statistical information, and may be reflected on the learning model. In an example, the server may identify the disaster type based on the disaster images and the related images described above. Here, the disaster type may be classified based on the disaster type defined in the disaster statistical database. That is, the disaster type may be determined based on the disaster statistical database information. Subsequently, the server may acquire information associated with a specified disaster type as the external data. In an example, the external data may include at least one of damage size information, damage frequency information, damage cost information, human loss information, damage cause information or fault related information based on the specified disaster type. Additionally, the external data may further include any other disaster related information, and is not limited to particular information.

FIG. 10 is a flowchart showing a method for identifying the disaster affected area in an embodiment of the present disclosure.

Referring to FIG. 10, there may be provided the operation method of the server for identifying the disaster affected area. In this instance, the server may acquire at least one first disaster image (S1010). In an example, the first disaster image may be an existing disaster image, and the server may acquire a plurality of existing disaster images. Subsequently, the server may derive the disaster affected area from each of the at least one first disaster image, and acquire the affected area related information through labeling based on the derived disaster affected area (S1020). Subsequently, the server may train a first learning model using the at least one first disaster image and the affected area related information (S1030). In this instance, the first learning model may be the above-described disaster identification learning model. That is, the server may train the disaster identification learning model using the plurality of existing disaster images.

In this instance, the server may derive a plurality of disaster prone areas based on the disaster affected area derived from each of the at least one first disaster image. That is, not only the disaster affected area but also the plurality of disaster prone areas may be derived, and disaster prone area related information may be acquired for each of the plurality of derived disaster prone areas based on labeling. Here, the first learning model may be trained further using the disaster prone area related information for each of the plurality of derived disaster prone areas. In this instance, in an example, the disaster prone area related information for each of the plurality of derived disaster prone areas may include the feature information for each of the plurality of disaster prone areas as described above. In this instance, the feature information may be information set considering the relevance of each of the plurality of disaster prone areas to the disaster affected area as described above. Additionally, the server may acquire a second disaster image from the external device. In this instance, the external device may be any one of the drone, the satellite and the airplane described in FIGS. 3A to 3C. Additionally, the external device may be another device or database, and is not limited to the above-described embodiment. Additionally, the second image may be a real disaster image that needs to be analyzed.

In this instance, the server may derive the disaster affected area and the disaster prone area from the second disaster image, acquire a plurality of disaster related information through labeling based on the derived disaster affected area and disaster prone area, and assign the weights to each of the plurality of acquired disaster related information. Subsequently, the server may provide the second disaster image and the plurality of disaster related information to the trained first learning model as the input, and output the disaster affected area identification information and the disaster damage type information based on the first learning model to identify the final disaster affected area.

Additionally, in an example, the server may acquire at least one related image related to the second disaster image, and the acquired image may be inputted to the first learning model together with the second disaster image and the plurality of disaster related information. In this instance, in an example, the at least one related image may include at least one of the pre-disaster image, the neighborhood image, the map image or the geographical image as described above. Additionally, in an example, the second disaster image may be inputted to a second learning model, and the second learning model may derive the disaster affected area and the disaster prone area of the second disaster image, and provide a plurality of disaster related information as the output information through labeling based on the derived disaster affected area and disaster prone area. Here, the second learning model may be the above-described information derivation learning model. That is, each of the disaster affected area and the disaster prone area may be derived as the landmark information based on the information derivation learning model.

Additionally, in an example, the server may receive damage propagation information for each of the derived disaster affected area and disaster prone area, and determine the weights for each of the plurality of acquired disaster related information further reflecting the damage propagation information. Here, the damage propagation information may be numericalized information considering the disaster occurrence probability as described above.

The embodiments described above may be, at least in part, incorporated into a computer program and recorded in a computer-readable recording medium. The computer-readable recording medium includes any type of recording device that records the program for realizing the embodiments and stores computer-readable data. Examples of the computer-readable recording medium include ROM, RAM, CD-ROM, magnetic tape, optical data storage devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and it will be appreciated by those having ordinary skill in the art that various modifications and variations may be made thereto. However, it should be noted that such modifications fall in the technical protection scope of the present disclosure. Therefore, the true technical protection scope of the present disclosure should be defined as including other embodiments, other examples and the equivalents to the appended claims by the technical spirit of the appended claims.

The invention claimed is:

1. An operation method of a server for identifying disaster affected areas by using disaster images with machine learnings, the operation method comprising:
    acquiring at least one first disaster image;
    deriving a first area from the at least one first disaster image, and acquiring first area related information through labeling based on the derived first area;
    training a first learning model using the at least one first disaster image and the first area related information;
    deriving a plurality of second areas based on the derived first area in the at least one first disaster image; and
    acquiring second area related information for each of the plurality of derived second areas based on labeling,
    wherein
        the first learning model is trained further using the second area related information for each of the plurality of derived second areas,
        the second area related information for each of the plurality of derived second areas includes feature information for each of the plurality of second areas, and
        the feature information is information which is set considering a relationship between each of the plurality of second areas and the first area;
    acquiring a second disaster image from an external device;
    deriving a first area and a plurality of second areas from the second disaster image, and acquiring a plurality of disaster related information through labeling based on the derived first area and the derived second areas;
    assigning a weight to each of the plurality of acquired disaster related information; and
    inputting the second disaster image and the plurality of disaster related information to the trained first learning model; and outputting first area identification information and disaster damage type information based on the first learning model,
    wherein
    the second disaster image is inputted to a second learning model,
    the second learning model derives the first area and the second areas of the second disaster image, and provides the plurality of disaster related information as output information through the labeling based on the derived first area and the derived second areas,
    the first area is an area which a disaster affects, and the second areas are areas which are located within a predetermined distance from the first area,
    the plurality of disaster related information generated through labeling in relation to the first and second disaster images include affected area information, damage type information, neighborhood feature information, damage propagation information and weather information at the time of the disaster, and
    the labeling of the first and second disaster images is performed in relation to the first area, and the plurality of disaster related information is generated through the labeling based on the second areas.

2. The operation method according to claim 1, further comprising:
    acquiring at least one related image related to the second disaster image,
    wherein the at least one related image is inputted to the first learning model together with the second disaster image and the plurality of disaster related information.

3. The operation method according to claim 1, wherein the at least one related image includes at least one of a pre-disaster image, a neighborhood image, a map image or a geographical image.

4. The operation method according to claim 1, wherein the server receives the damage propagation information for the derived first area and the derived second area,
    wherein the weight for each of the plurality of acquired disaster related information is determined further reflecting the damage propagation information, and
    wherein the damage propagation information is numericalized information considering a disaster occurrence probability.

5. The operation method according to claim 4, wherein the server receives external data related to the first disaster image and the second disaster image from a network or an external device, assigns the weight and provides as the input of the first learning model.

6. The operation method according to claim 5, wherein the server acquires the external data from a disaster statistical database,
    wherein the server identifies a disaster type based on the first disaster image and the second disaster image, extracts at least one information corresponding to the disaster type from the disaster statistical database and acquires the at least one information as the external data, and
    wherein the at least one information includes at least one of damage size information, damage frequency information, damage cost information, human loss information, damage cause information or fault related information.

7. A computer program stored in a non-transitory computer-readable medium to perform the operation method according to claim 1 in combination with hardware.

8. A server for identifying disaster affected areas by using disaster images with machine learnings, the server comprising:
    a transmitter/receiver to communicate with an external device; and
    a processor to control the transmitter/receiver,
    wherein the processor is configured to:
    acquire at least one first disaster image;

derive a first area from the at least one first disaster image, and acquire first area related information through labeling based on the derived first area;
train a first learning model using the at least one first disaster image and the first area related information;
derive a plurality of second areas based on the derived first area in the at least one first disaster image; and
acquire second area related information for each of the plurality of derived second areas based on labeling,
wherein
the first learning model is trained further using the second area related information for each of the plurality of derived second areas,
the second area related information for each of the plurality of derived second areas includes feature information for each of the plurality of second areas, and
the feature information is information which is set considering a relationship between each of the plurality of second areas and the first area;
acquire a second disaster image from the external device;
derive a first area and a second area from the second disaster image;
acquire a plurality of disaster related information through labeling based on the derived first area and the derived second area; and
assign a weight to each of the plurality of acquired disaster related information, input the second disaster image and the plurality of disaster related information to the trained first learning model, and output first area identification information and disaster damage type information based on the first learning model,
wherein
the second disaster image is inputted to a second learning model, and the second learning model derives the first area and the second area of the second disaster image, and provides the plurality of disaster related information as output information through the labeling based on the derived first area and the derived second area,
the first area is an area which a disaster affects, and the second areas are areas which are located within a predetermined distance from the first area,
the plurality of damage related information generated through labeling in relation to the first and second disaster images include affected area information, damage type information, neighborhood feature information, damage propagation information and weather information at the time of the disaster,
the labeling of the first and second disaster images is performed in relation to the first area, and the plurality of disaster related information is generated through the labeling based on the second areas.

9. The server according to claim 8, wherein the processor is further configured to acquire at least one related image related to the second disaster image, and
wherein the at least one related image is inputted to the first learning model together with the second disaster image and the plurality of disaster related information.

10. The server according to claim 9, wherein the at least one related image includes at least one of a pre-disaster image, a neighborhood image, a map image or a geographical image.

11. The server according to claim 8, wherein the processor is further configured to receive damage propagation information for the derived first area and the derived second area,
wherein the weight for each of the plurality of acquired disaster related information is determined further reflecting the damage propagation information, and
wherein the damage propagation information is numericalized information considering a disaster occurrence probability.

12. The server according to claim 11, wherein the server receives external data related to the first disaster image and the second disaster image from a network or an external device, assigns the weight and provides as the input of the first learning model.

13. The server according to claim 12, wherein the server acquires the external data from a disaster statistical database,
wherein the server identifies a disaster type based on the first disaster image and the second disaster image, extracts at least one information corresponding to the disaster type from the disaster statistical database and acquires the at least one information as the external data, and
wherein the at least one information includes at least one of damage size information, damage frequency information, damage cost information, human loss information, damage cause information or fault related information.

* * * * *